United States Patent
Rathnakara et al.

(10) Patent No.: US 12,314,221 B2
(45) Date of Patent: May 27, 2025

(54) MANAGING ATTRIBUTES IN CHILD NODES FOR A MULTI-PART FILE

(71) Applicant: NetApp, Inc., San Jose, CA (US)

(72) Inventors: Kartik Rathnakara, Bengaluru (IN); Roy Matthew LeCates, Baden, PA (US); Sushrut Bhowmik, Cary, NC (US); Richard Parvin Jernigan, IV, Sewickley, PA (US)

(73) Assignee: NetApp, Inc., San Jose, CA (US)

( * ) Notice: Subject to any disclaimer, the term of this patent is extended or adjusted under 35 U.S.C. 154(b) by 71 days.

(21) Appl. No.: 18/305,918

(22) Filed: Apr. 24, 2023

(65) Prior Publication Data

US 2024/0354284 A1    Oct. 24, 2024

(51) Int. Cl.
*G06F 16/11* (2019.01)
*G06F 16/16* (2019.01)

(52) U.S. Cl.
CPC .......... *G06F 16/122* (2019.01); *G06F 16/162* (2019.01)

(58) Field of Classification Search
CPC .................................................. G06F 16/122
See application file for complete search history.

(56) References Cited

U.S. PATENT DOCUMENTS

| | | | |
|---|---|---|---|
| 6,105,148 A * | 8/2000 | Chung | G06F 11/1438 714/E11.13 |
| 9,886,697 B1 | 2/2018 | Sivertsen | |
| 2009/0210431 A1* | 8/2009 | Marinkovic | G06F 16/1827 709/227 |
| 2013/0226888 A1* | 8/2013 | Govind | G06F 16/172 707/698 |
| 2016/0110258 A1* | 4/2016 | Haustein | G06F 16/00 707/646 |
| 2019/0215358 A1* | 7/2019 | Kobayashi | H04L 67/1097 |

* cited by examiner

*Primary Examiner* — Van H Oberly
(74) *Attorney, Agent, or Firm* — Jaffery Watson Hamilton & DeSanctis LLP

(57) ABSTRACT

Approaches for setting file attributes in a distributed file system using a multipart file structure are described. A request to set attributes for one or more parts of a multipart file is received. In response to the request, a rectify indicator is set to indicate the attributes for the multipart file that are to be set. In response to the request, an entry corresponding to the request is created in a rectify database. The attributes for the one or more parts of the multipart files are set using at least the entry in the rectify database.

20 Claims, 12 Drawing Sheets

MANAGING ATTRIBUTES IN CHILD NODES FOR A MULTI-PART FILE

BACKGROUND

A node, such as a server, a computing device, a virtual machine, etc., may host a storage operating system. The storage operating system may be configured to store data on behalf of client devices, such as within volumes, aggregates, storage devices, cloud storage, locally attached storage, etc. In this way, a client can issue a read operation or a write operation to the storage operating system of the node to read data from storage or write data to the storage. The storage operating system may implement a storage file system through which the data is organized and accessible to the client devices. The storage file system may be tailored for managing the storage and access of data within hard drives, solid state drives, cloud storage, and/or other storage that may be relatively slower than memory or other types of faster and lower latency storage.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
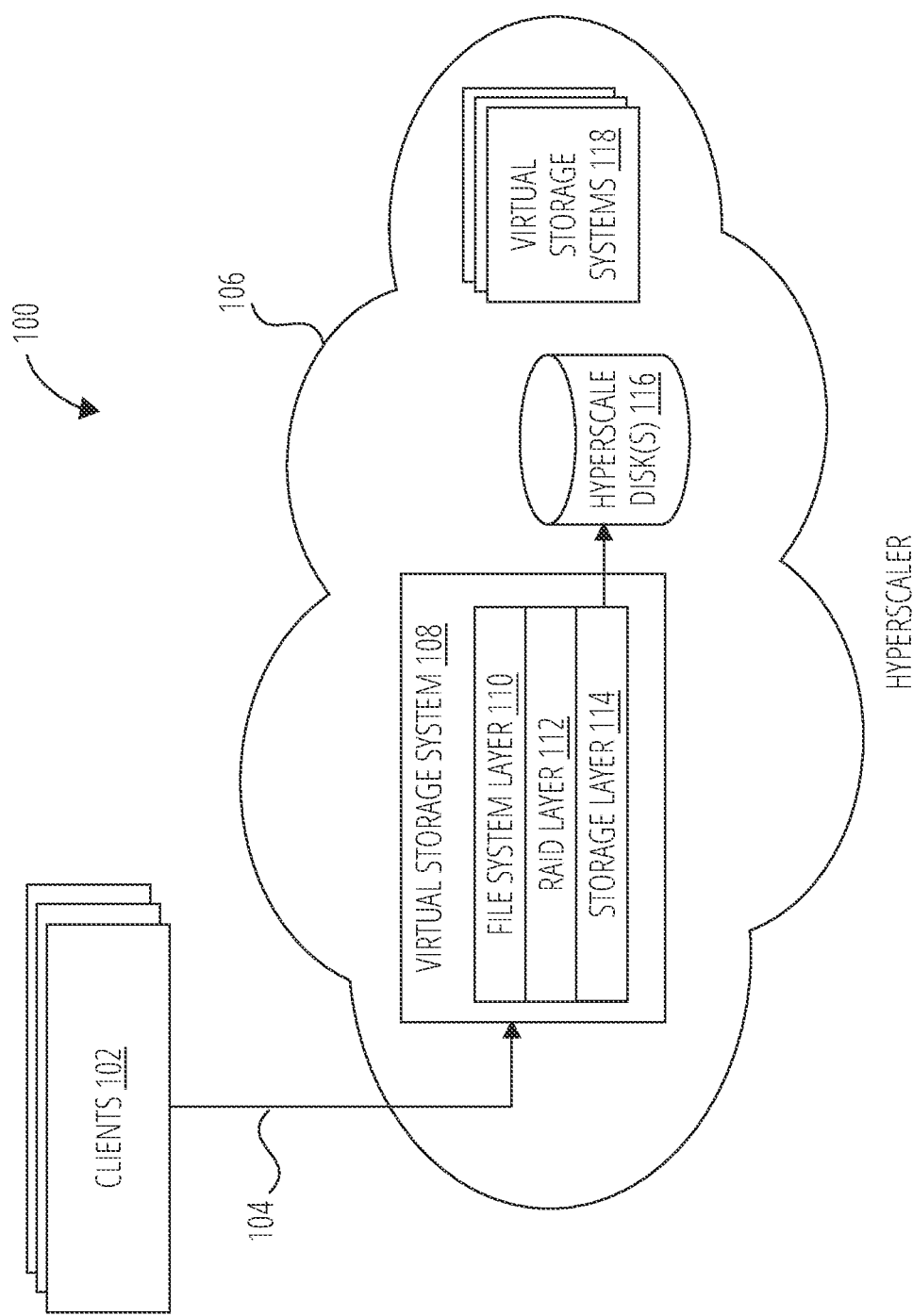
FIG. 1 is a block diagram illustrating an environment in which various embodiments may be implemented.

In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

A distributed file system is a file system that is distributed on multiple file servers and can be distributed over multiple locations. This approach allows multiple users on multiple client devices to share files and storage resources. One example architecture described below (e.g., FIG. 1) is a cloud-based virtual storage architecture. Other architectures can also be utilized to provide a distributed file system.

In some examples below, the distributed storage system can be managed via a storage operating system. Illustratively, the storage operating system can be the Data ONTAP® operating system available from NetApp™ Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this disclosure. Also, storage operating systems other than ONTAP® can be utilized including, for example, NetApp Cloud Volume Service available from NetApp™ Inc., AZURE® NetApp Files available from Microsoft Corporation, of Redmond, Washington, Amazon FSx® for NetApp ONTAP available from Amazon.com, Inc., of Bellevue, Washington, etc.

In a distributed file system file placement is initially performed via implementation of one or more heuristics that provide an optimal placement of newly created files throughout the distributed system. For example, when a command is received to create a new data container (e.g., a subdirectory) in a distributed file system, a remote access module performs a first heuristic procedure to determine whether the new subdirectory should be created locally (e.g., on a flexible volume (or any other volume) associated with a physical node executing the command), or whether the subdirectory should be created remotely (e.g., on a flexible volume associated with a node not directly attached to the node generating the command). If the subdirectory is to be created remotely, a second heuristic procedure may be performed to determine which remote flexible volume should hold the new subdirectory. The second heuristic procedure then selects the remote flexible volume. The subdirectory is then created on the identified remote flexible volume.

However, over time factors such as file size and file operations load may change to such a degree that the original placement may become sub-optimal. Thus, according to embodiments, mechanisms are provided to automatically rebalance file distribution and non-disruptively move files within the distributed file system to more accurately reflect an optimal distribution.

As described in greater detail below, the non-disruptive move mechanisms can retroactively move a file to any volume/constituent of a group (of volumes/constituents). More specifically these mechanisms use utilize an inode structure call a multipart inode that forms the building blocks to non-disruptively move a file. Various details regarding inode structures are described in greater detail below.

For rebalancing, for example, the multipart inode can operate as a redirector file to enable a client device to have access to a valid file handle to ensure no disruptions. For example, a file (F1) that is being moved from a source constituent (C1) to a destination constituent (C2) has an associated file handle (fh1). When the non-disruptive file movement occurs, a new file in the source constituent (C1) is created (FPart1_C1) as part of converting the original file (F1) to a multipart file.

In an example, the contents of the original file (F1) are moved to the file part (FPart1_C1) and the location of FPart1_C1 is written as an entry in multipart file F1. When a client device using the file handle fh1 to access the file, the multipart file F1 is retrieved where its multipart file is identified. As a result, the location (i.e., where the data is hosted) of the part file FPart1_C1 is retrieved.

Because the part inode FPart1_C1 is on constituent C1, client traffic is routed to FPart1_C1 and data is returned to the client. After converting the original file to a multipart file, the file FPart1_C1 can be moved to the destination constituent C2. When the file is moved to C2 as FPart1_C2 the location of the partial inode is changed atomically. Any subsequent client traffic on fh1 is routed to FPart1_C2 through the multipart file F1. Thus, there is no disruption to client access as the file handle stays intact throughout the file movement process.

As described in greater detail below, there can be many file attributes that can be set by using operations that point to a multipart file. Most of the attributes can be set directly on the multipart file inodes. Multipart inodes can have a large number of part inodes, which can result in significant latency when all part inodes are loaded, for example, to gather or change attributes.

In example embodiments to overcome the latency issue, a background process can be tasked with loading all part inodes and setting attributes on all the part inodes. In an example, when a file operation is used to set attributes on a multipart file handle, the operation only stores the attribute and its value in a catalog inode or a new metafile. Thus, the file operation receives a response relatively quickly, which reduces latency. The background process can load all part inodes and read the required attributes and values from the catalog file or the metafile and set the attributes on the part inodes. In an example, the background process can handle a subset of attributes and other attributes are handled inline where the client waits for the attribute to be set.

FIG. 1 is a block diagram illustrating an environment in which various embodiments may be implemented. Specifically, FIG. 1 illustrates an example, cloud-based virtual storage architecture 100. In various examples described herein, virtual storage system 108, which may be considered exemplary of virtual storage systems of hyperscaler 106 (e.g., virtual storage system 108, virtual storage systems 118), may be run (e.g., on a VM or as a containerized instance, as the case may be) within a public cloud provided by a public cloud provider (e.g., hyperscaler 106). In the context of the example of FIG. 1, virtual storage system 108 makes use of storage (e.g., hyperscale disk(s) 116) provided by the hyperscaler, for example, in the form of solid-state drive (SSD) backed or hard-disk drive (HDD) backed disks. The cloud disks (which may also be referred to herein as cloud volumes, storage devices, or simply volumes or storage) may include persistent storage (e.g., disks) and/or ephemeral storage (e.g., disks).

Virtual storage system 108 may present storage over a network to clients 102 using various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 102 may request services of virtual storage system 108 by issuing input/output request(s) 104 (e.g., file system protocol messages (in the form of packets) over the network). A representative client of clients 102 may comprise an application, such as a database application, executing on a computer that "connects" to the virtual storage system 110 over a computer network, such as a point-to-point link, a shared local area network (LAN), a wide area network (WAN), or a virtual private network (VPN) implemented over a public network, such as the Internet.

In the context of the present example, virtual storage system 108 is shown including a number of layers, including file system layer 110 and one or more intermediate storage layers (e.g., RAID layer 112 and storage layer 114). These layers may represent components of data management software (not shown) of virtual storage system 108. File system layer 110 generally defines the basic interfaces and data structures in support of file system operations (e.g., initialization, mounting, unmounting, creating files, creating directories, opening files, writing to files, and reading from files). A non-limiting example of file system layer 110 is the Write Anywhere File Layout (WAFL) Copy-on-Write file system (which represents a component or layer of ONTAP software available from NetApp, Inc. of Sunnyvale, CA).

RAID layer 112 may be responsible for encapsulating data storage virtualization technology for combining multiple hyperscale disk(s) 116 into RAID groups, for example, for purposes of data redundancy, performance improvement, or both. Storage layer 114 may include storage drivers for interacting with the various types of hyperscale disk(s) 116 supported by hyperscaler 106. Depending upon the particular implementation file system layer 110 may persist data to hyperscale disk(s) 116 using one or both of RAID layer 112 and storage layer 114.

The various layers described herein, and the processing described below with reference to the flow diagrams of FIG. 7 and FIG. 9 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms (e.g., servers, blades, network storage systems or appliances, and storage arrays, such as the computer system described with reference to FIG. 8 and/or FIG. 10 below.

Figure 2:
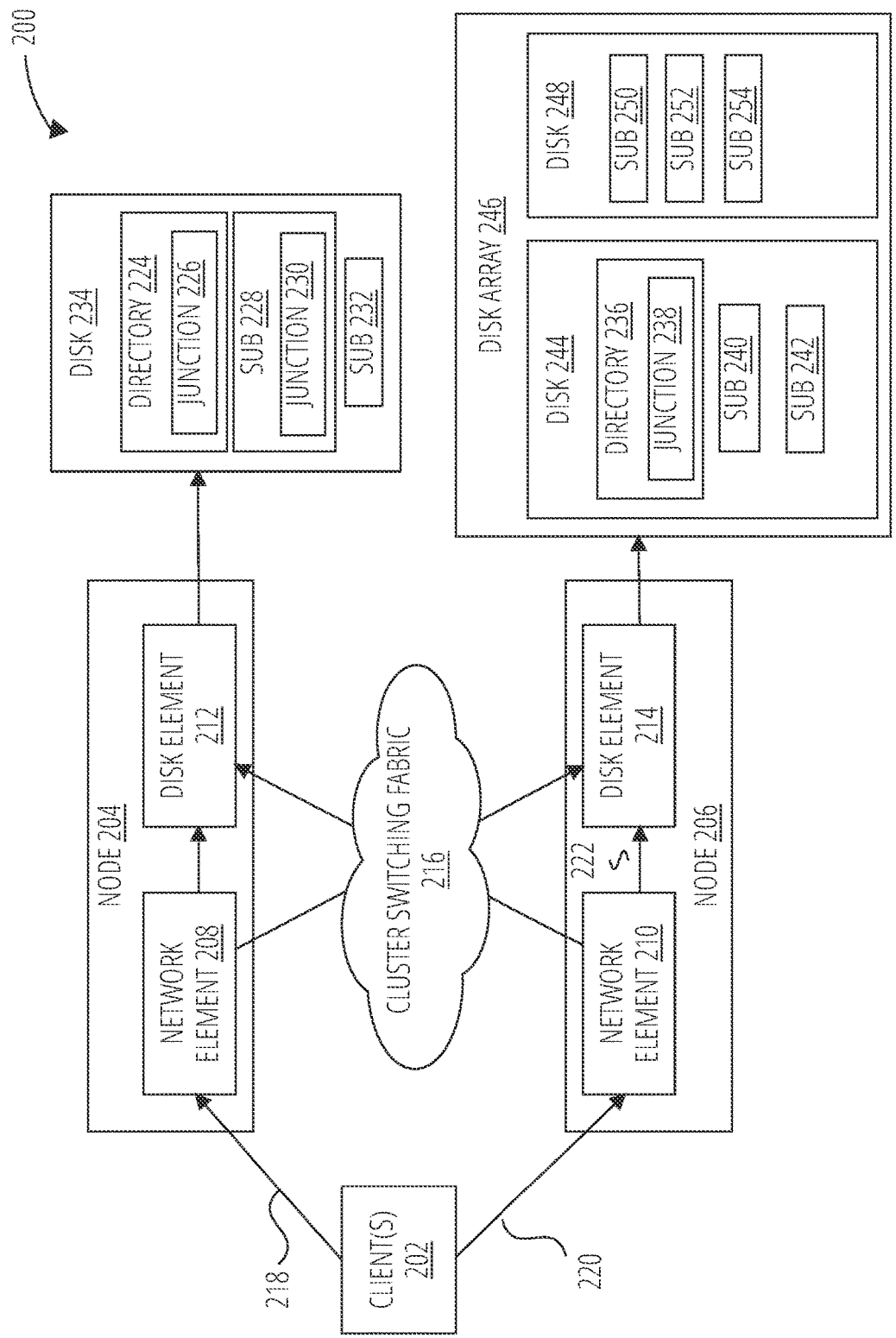
FIG. 2 illustrates one embodiment of a block diagram of a plurality of nodes interconnected as a cluster.

FIG. 2 illustrates one embodiment of a block diagram of a plurality of nodes interconnected as a cluster. The cluster of nodes illustrated in FIG. 2 can be configured to provide storage services relating to the organization of information on storage devices, for example, in cloud-based virtual storage architecture 100. Specifically, node 204 and node 206 can be part of virtual storage system 108 as illustrated in FIG. 1. Further, the cluster of nodes illustrated in FIG. 2 can be managed utilizing the rebalancing strategies (e.g., rebalancing engine(s), rebalancing scanner(s), non-disruptive move mechanism) described herein.

The nodes of FIG. 2 (e.g., node 204, node 206) include various functional components that cooperate to provide a distributed storage system architecture of cluster 200. To that end, each node is generally organized as a network element (e.g., network element 208 in node 204, network element 210 in node 206) and a storage element (also referred to as a disk element, for example, disk element 212 in node 204, disk element 214 in node 206). The network elements provide functionality that enables the nodes to connect to client(s) 202 over one or more network connections (e.g., 218, 220), while each disk element connects to one or more storage devices (e.g., disk 234, disk array 246).

In the example of FIG. 2, disk element 212 connects to disk 234 and disk element 214 connection to disk array 246 (which includes disk 244 and disk 248). Node 204 and node 206 are interconnected by cluster switching fabric 216 which, in an example, may be a Gigabit Ethernet switch or any other switch type. It should be noted that while there is shown an equal number of network and disk elements in cluster 200, there may be differing numbers of network and/or disk elements. For example, there may be a plurality of network elements and/or disk elements interconnected in a cluster configuration that does not reflect a one-to-one correspondence between the network and disk elements. As such, the description of a node comprising one network elements and one disk element should be taken as illustrative only.

Client(s) 202 may be general-purpose computers configured to interact with node 204 and node 206 in accordance with a client/server model of information delivery. That is, each client may request the services of a node, and the corresponding node may return the results of the services requested by the client by exchanging packets over one or more network connections (e.g., 218, 220).

Client(s) 202 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Disk elements (e.g., disk element 212, disk element 214) are illustratively connected to disks that may be individual disks (e.g., disk 234) or organized into disk arrays (e.g., disk array 246). Alternatively, storage devices other than disks may be utilized, e.g., flash memory, optical storage, solid state devices, etc. As such, the description of disks should be taken as exemplary only. As described below, in reference to FIG. 5, a file system may implement a plurality of flexible volumes on the disks. Flexible volumes may comprise a plurality of directories (e.g., directory 224, directory 236) and a plurality of subdirectories (e.g., sub 228, sub 240, sub 250, sub 252, sub 254). Junctions (e.g., junction 226, junction 230, junction 238) may be located in directories and/or subdirectories. It should be noted that the distribution of directories, subdirectories and junctions shown in FIG. 2 is for illustrative purposes. As such, the description of the directory structure relating to subdirectories and/or junctions should be taken as exemplary only.

Figure 3:
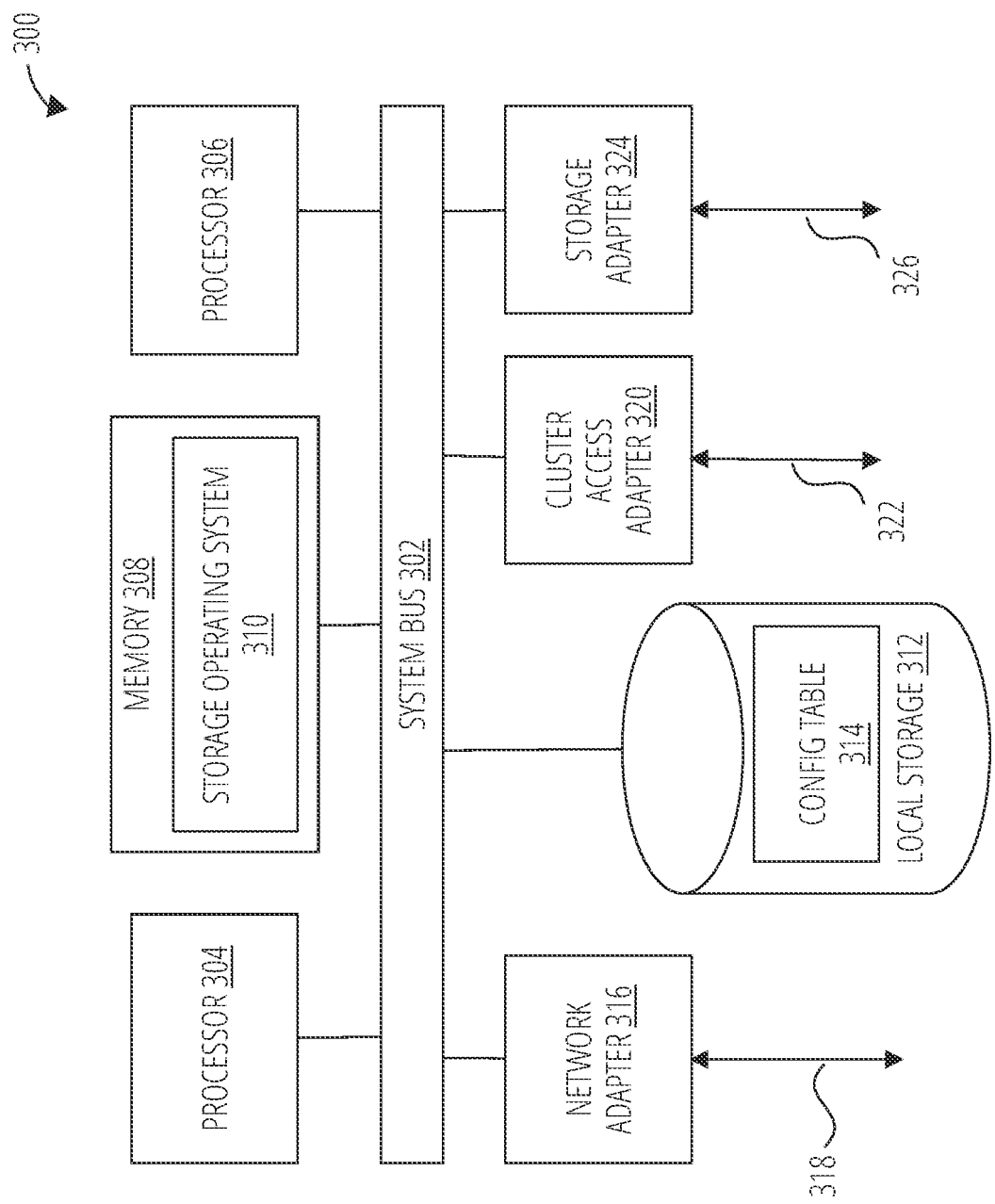
FIG. 3 illustrates one embodiment of a block diagram of a node.

FIG. 3 illustrates one embodiment of a block diagram of a node. Node 300 can be, for example, node 204 or node 206 as discussed in FIG. 2. The nodes illustrated in FIG. 3 can be managed utilizing the rebalancing strategies (e.g., rebalancing engine(s), rebalancing scanner(s), non-disruptive move mechanism) described herein.

In the example of FIG. 3, node 300 includes processor 304 and processor 306, memory 308, network adapter 316, cluster access adapter 320, storage adapter 324 and local storage 312 interconnected by 202. In an example, local storage 312 can be one or more storage devices, such as disks, utilized by the node to locally store configuration information (e.g., in config table 314).

Cluster access adapter 320 provides a plurality of ports adapted to couple node 300 to other nodes (not illustrated in FIG. 3) of a cluster. In an example, Ethernet is used as the clustering protocol and interconnect media, although it will be apparent to those skilled in the art that other types of protocols and interconnects may be utilized within the cluster architecture described herein. Alternatively, where the network elements and disk elements are implemented on separate storage systems or computers, cluster access adapter 320 is utilized by the network element (e.g., network element 208, network element 210) and disk element (e.g., disk element 212, disk element 214) for communicating with other network elements and disk elements in the cluster.

Figure 11:
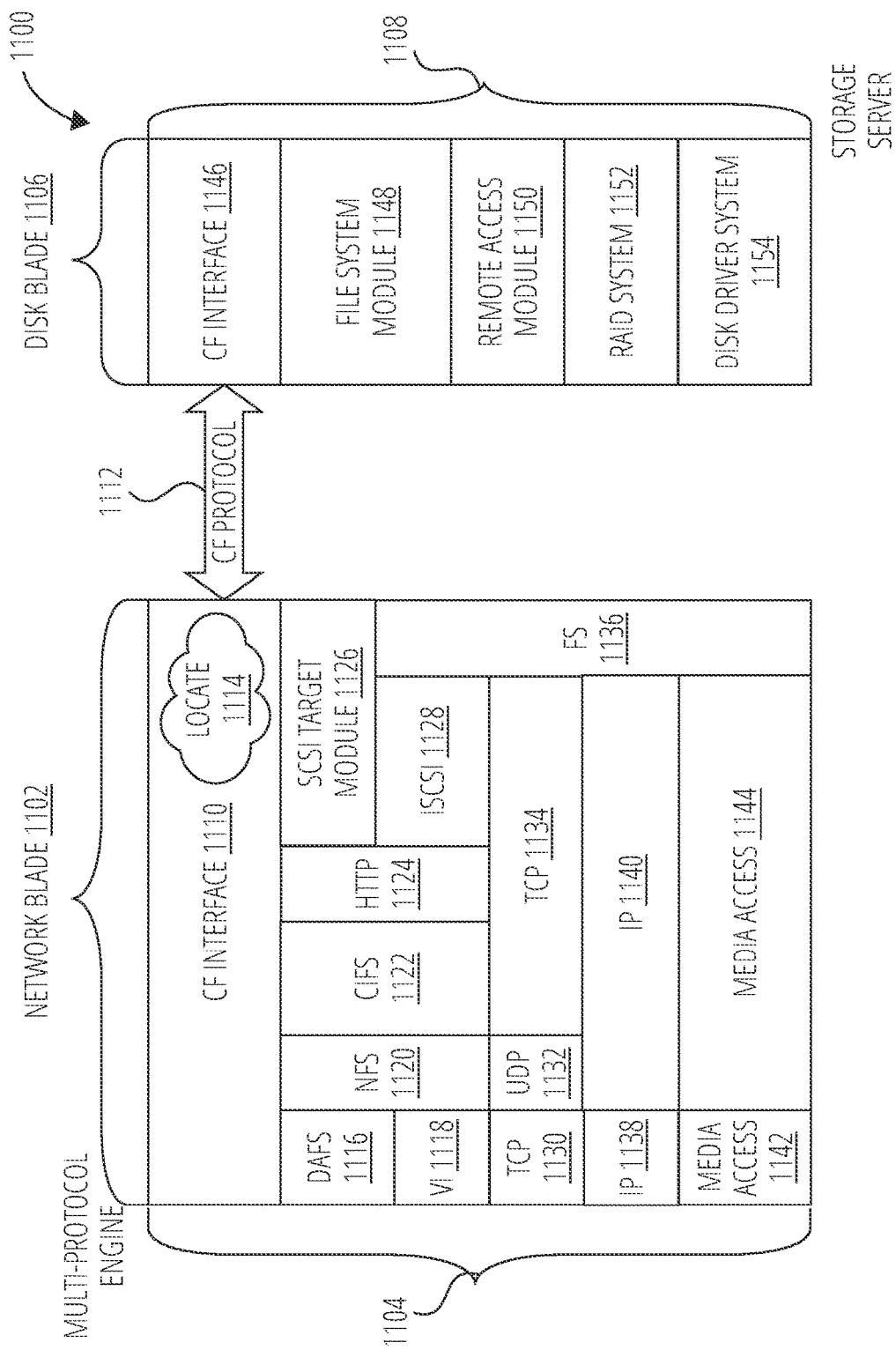
FIG. 11 illustrates one embodiment of a block diagram of a storage operating system.

In the example of FIG. 3, node 300 is illustratively embodied as a dual processor storage system executing storage operating system 310 that can implement a high-level module, such as a file system, to logically organize the information as a hierarchical structure of named directories, files and special types of files called virtual disks (hereinafter generally "blocks") on the disks. However, it will be apparent to those of ordinary skill in the art that node 300 may alternatively comprise a single or more than two processor system. In an example, processor 304 executes the functions of the network element on the node, while processor 306 executes the functions of the disk element. FIG. 11 provides further details with respect to an example schematic block diagram of a storage operating system.

In an example, memory 308 illustratively comprises storage locations that are addressable by the processors and adapters for storing software program code and data structures associated with the subject matter of the disclosure. The processor and adapters may, in turn, comprise processing elements and/or logic circuitry configured to execute the software code and manipulate the data structures. Storage operating system 310, portions of which is typically resident in memory and executed by the processing elements, functionally organizes node 300 by, inter alia, invoking storage operations in support of the storage service implemented by the node. It will be apparent to those skilled in the art that other processing and memory means, including various computer readable media, may be used for storing and executing program instructions pertaining to the disclosure described herein.

Illustratively, storage operating system 310 can be the Data ONTAP® operating system available from NetApp™, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this disclosure. In an example, the ONTAP operating system can provide (or control the functionality of) the rebalancing engine and/or the rebalancing scanner as described herein. For further details with respect to example embodiments of storage operating system 310, a schematic block diagram of a storage operating system that may be advantageously used with the subject matter is provided in FIG. 11 and the corresponding description.

In an example, network adapter 316 provides a plurality of ports adapted to couple node 300 to one or more clients (e.g., client(s) 202) over one or more connections 318, which can be point-to-point links, wide area networks, virtual private networks implemented over a public network (Internet) or a shared local area network. Network adapter 316 thus may include the mechanical, electrical and signaling circuitry needed to connect the node to the network. Illustratively, the computer network may be embodied as an Ethernet network or a Fibre Channel (FC) network. Each client may communicate with the node over network connections by exchanging discrete frames or packets of data according to pre-defined protocols, such as TCP/IP.

In an example, to facilitate access to disks, storage operating system 310 implements a write-anywhere file system that cooperates with one or more virtualization modules to "virtualize" the storage space provided by the disks. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (LUNs).

In an example, storage of information on each array is implemented as one or more storage "volumes" that comprise a collection of physical storage disks cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

As used herein, the term "storage operating system" generally refers to the computer-executable code operable on a computer to perform a storage function that manages data access and may, in the case of a node, implement data access semantics of a general-purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that aspects of the disclosure described herein may apply to any type of special-purpose (e.g., file server, filer or storage serving appliance) or general-purpose computer, including a standalone computer or portion thereof, embodied as or including a storage system. Moreover, the teachings contained herein can be adapted to a variety of storage system architectures including, but not limited to, a network-attached storage environment, a storage area network and disk assembly directly attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the subject matter may be utilized with any suitable file system, including a write in place file system.

Storage adapter 324 cooperates with storage operating system 310 to access information requested by the clients. The information may be stored on any type of attached array of writable storage device media such as video tape, optical, DVD, magnetic tape, bubble memory, electronic random-access memory, micro-electromechanical and any other similar media adapted to store information, including data and parity information. However, as illustratively described herein, the information is stored on disks or an array of disks utilizing one or more connections 322. Storage adapter 324 provides a plurality of ports having input/output (I/O) interface circuitry that couples to the disks over an I/O interconnect arrangement 326, such as a conventional high-performance, CF link topology.

Figure 4:
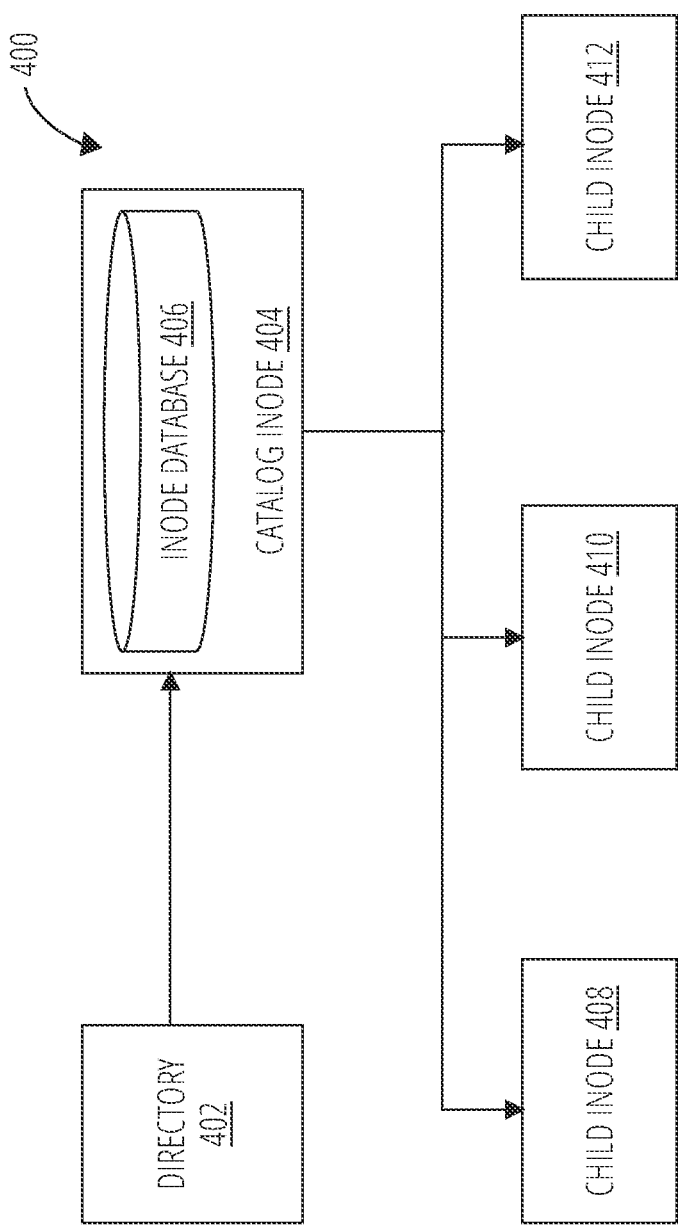
FIG. 4 illustrates one embodiment of a block diagram of a redirection layer.

FIG. 4 illustrates one embodiment of a block diagram of a redirection layer. In an example, redirection layer 400 includes directory 402 that points to catalog inode 404. In one embodiment, catalog inode 404 includes inode database 406 that operates as a multipart catalog that lists a plurality of child inodes (e.g., child inode 408, child inode 410, child inode 412). In such an embodiment, the child inodes each store components of file data such that a first component of data may be stored in child inode 408, a second component of data may be stored in child inode 410, a third component of data may be stored in child inode 412, etc. As a result, a conceptual location of a file may be disassociated with the actual location of the stored data. Example uses of the components illustrated in FIG. 4 are provided within the context of setting attributes of child inodes in the figures that follow.

Figure 5:
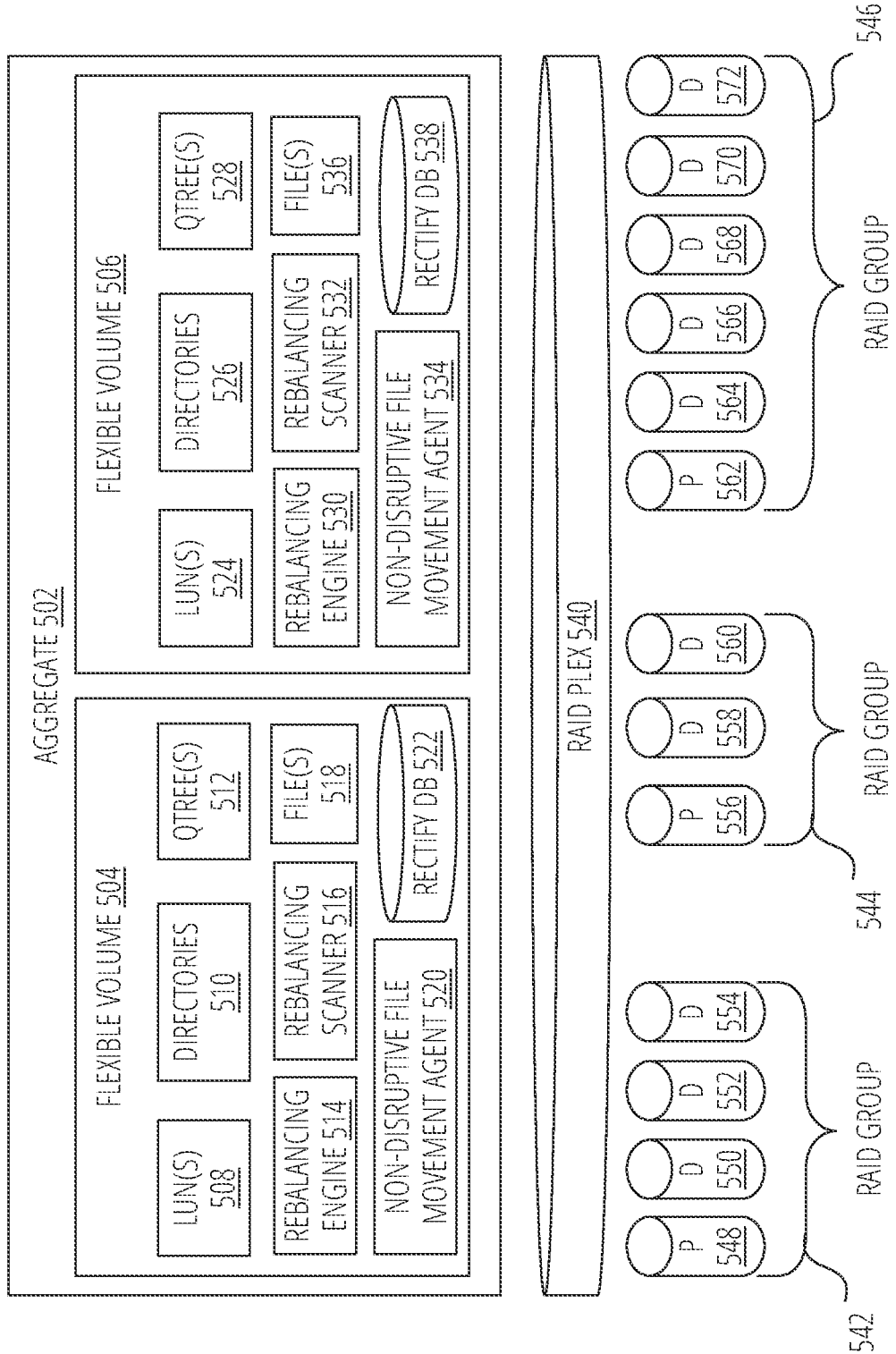
FIG. 5 illustrates one embodiment of a block diagram of an aggregate.

FIG. 5 illustrates one embodiment of a block diagram of an aggregate. In one embodiment, a file system layout is provided that apportions an underlying physical volume into one or more virtual volumes (or flexible volumes) of a storage system. In an example each flexible volume (e.g., flexible volume 504, flexible volume 506) can include a rebalancing engine (e.g., rebalancing engine 514, rebalancing engine 530), a rebalancing scanner (e.g., rebalancing scanner 516, rebalancing scanner 532), and a non-disruptive file movement agent (e.g., non-disruptive file movement agent 520, non-disruptive file movement agent 534) that operate to rebalance files.

Figure 12:
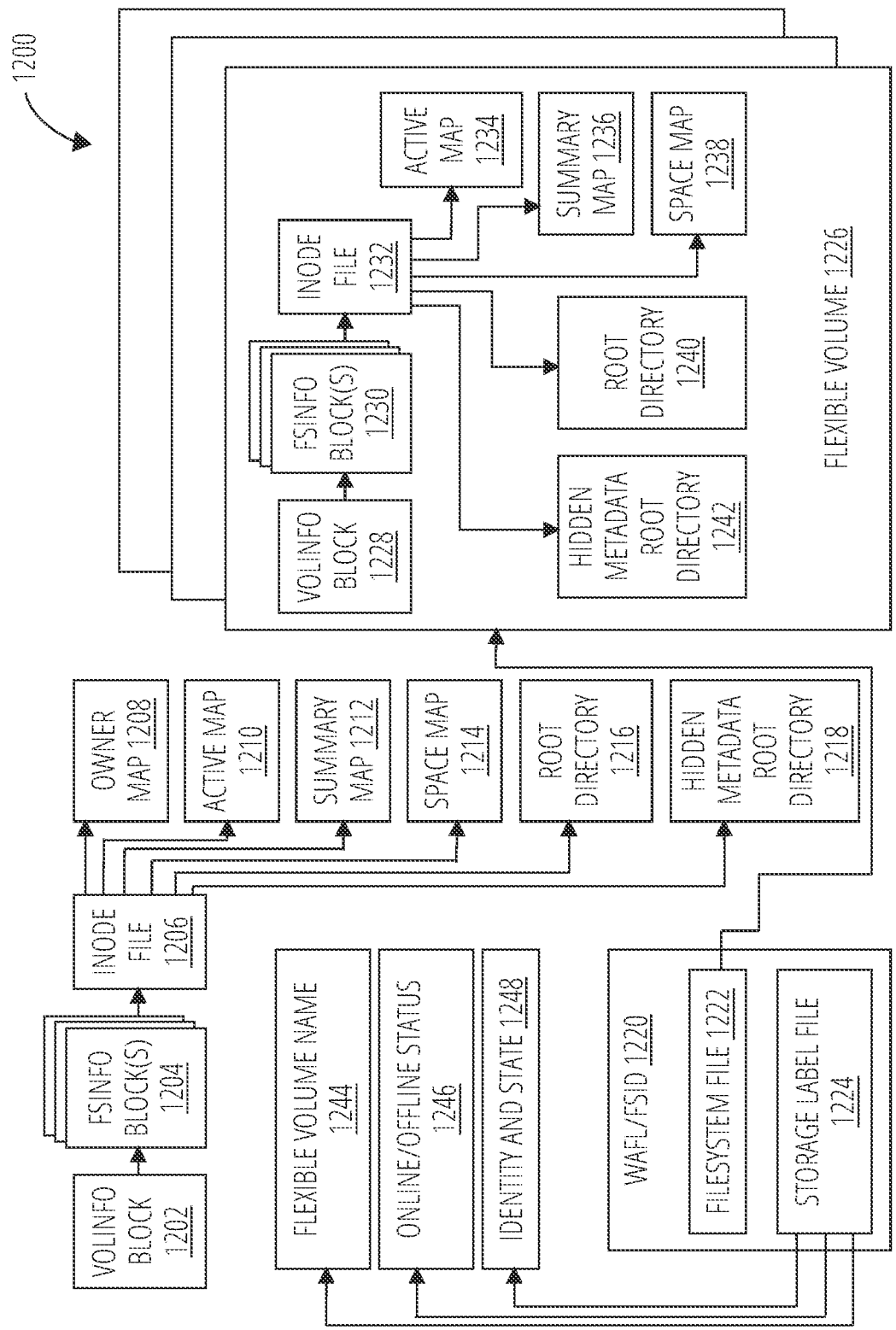
FIG. 12 illustrates one embodiment of a block diagram of an on-disk layout of the aggregate.

Files can be converted to multipart files having part inodes having corresponding attributes for other reasons. Rectify databases, or data structures, (e.g., rectify db 522, rectify db 538) can be used for setting of attributes for one or more part inodes (described in greater detail with respect to FIG. 6, FIG. 7, FIG. 8, FIG. 9 and FIG. 10. For further details with respect to example embodiments of aggregate 502, FIG. 12 illustrates a block diagram of an example on-disk layout of an aggregate.

In such an embodiment, the underlying physical volume is an aggregate comprising one or more groups of disks, such as RAID groups, of the node. In an example, aggregate 502 has its own physical volume block number (pvbn) space and maintains meta-data, such as block allocation structures, within that pvbn space. Each flexible volume (e.g., flexible volume 504, flexible volume 506) has its own virtual volume block number (vvbn) space and maintains meta-data, such as block allocation structures, within that vvbn space. Each flexible volume is a file system that is associated with a container file; the container file is a file in aggregate 502 that contains all blocks used by the flexible volume. Moreover, each flexible volume comprises data blocks and indirect blocks that contain block pointers that point at either other indirect blocks or data blocks.

LUN(s) 508, directories 510, Qtree(s) 512 and file(s) 518 are included within flexible volume 504 and, LUN(s) 524, directories 526, Qtree(s) 528 and file(s) 536 are included within flexible volume 506, such as dual vbn flexible volumes, that, in turn, are contained within aggregate 502. In one embodiment, flexible volume 504 and/or flexible volume 506 including elements within the flexible volumes may comprise junctions to provide redirection information to other flexible volumes, which may be contained within aggregate 502, may be stored in aggregate service by other key modules in the distributed file system. Assets, the description of elements being stored within a flexible volume should be taken as exemplary only. Aggregate 502 is illustratively layered on top of the RAID system, which is represented by at least one RAID plex 540 (depending upon whether the storage configuration is mirrored), wherein each RAID plex 540 includes at least one RAID group (e.g., RAID group 542, RAID group 544, RAID group 546). Each RAID group further comprises a plurality of disks, one or more data (D) disks (e.g., 550, 552, 554, 558, 560, 564, 566, 568, 570, 572) and at least one (P) parity disk (e.g., 548, 556, 562).

Whereas aggregate 502 is analogous to a physical volume of a conventional storage system, a flexible volume (e.g., flexible volume 504, flexible volume 506) is analogous to a file within that physical volume. That is, aggregate 502 may include one or more files, wherein each file contains a flexible volume and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume is also a logical volume, it has its own block allocation structures (e.g., active, space and summary maps) in its vvbn space.

In a further embodiment, pvbns are used as block pointers within buffer trees of files stored in a flexible volume. This "hybrid" flexible volume example involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk, dbn occurs at the file system/RAID system boundary of the storage operating system.

In a dual vbn hybrid flexible volume example, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks.

A root (top-level) inode, such as an embedded inode, references indirect (e.g., level 1) blocks. Note that there may be additional levels of indirect blocks (e.g., level 2, level 3) depending upon the size of the file. The indirect blocks (and inode) include pvbn/vvbn pointer pair structures that ultimately reference data blocks used to store the actual data of the file. The pvbns reference locations on disks of the aggregate, whereas the vvbns reference locations within files of the flexible volume. The use of pvbns as block pointers in the indirect blocks provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

A container file is a file in the aggregate that includes all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes.

Specifically, a physical file system directory includes a subdirectory for each flexible volume in the aggregate, with the name of subdirectory being a file system identifier (fsid) of the flexible volume. Each fsid subdirectory (flexible volume) contains at least two files, a file system file and a storage label file. The storage label file is illustratively a 4 kB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Aggregate 502 can be configured as a FlexGroup as supported by the ONTAP® operating system. However, it is expressly contemplated that any appropriate storage operating system may be enhanced for use in accordance with the inventive principles described herein. In the FlexGroup example, a constituent volume refers to the underlying flexible volume (e.g., flexible volume 504, flexible volume 506) that provide the storage functionality of the FlexGroup. A FlexGroup is a single namespace that can be made up of multiple constituent volumes ("constituents"). In an example, each FlexGroup contains an entity (e.g., "Flex-Group State") that has an object corresponding to each constituent of the FlexGroup and collects information for each constituent. The FlexGroup State can also exchange constituent information with other peer FlexGroups.

Figure 6:
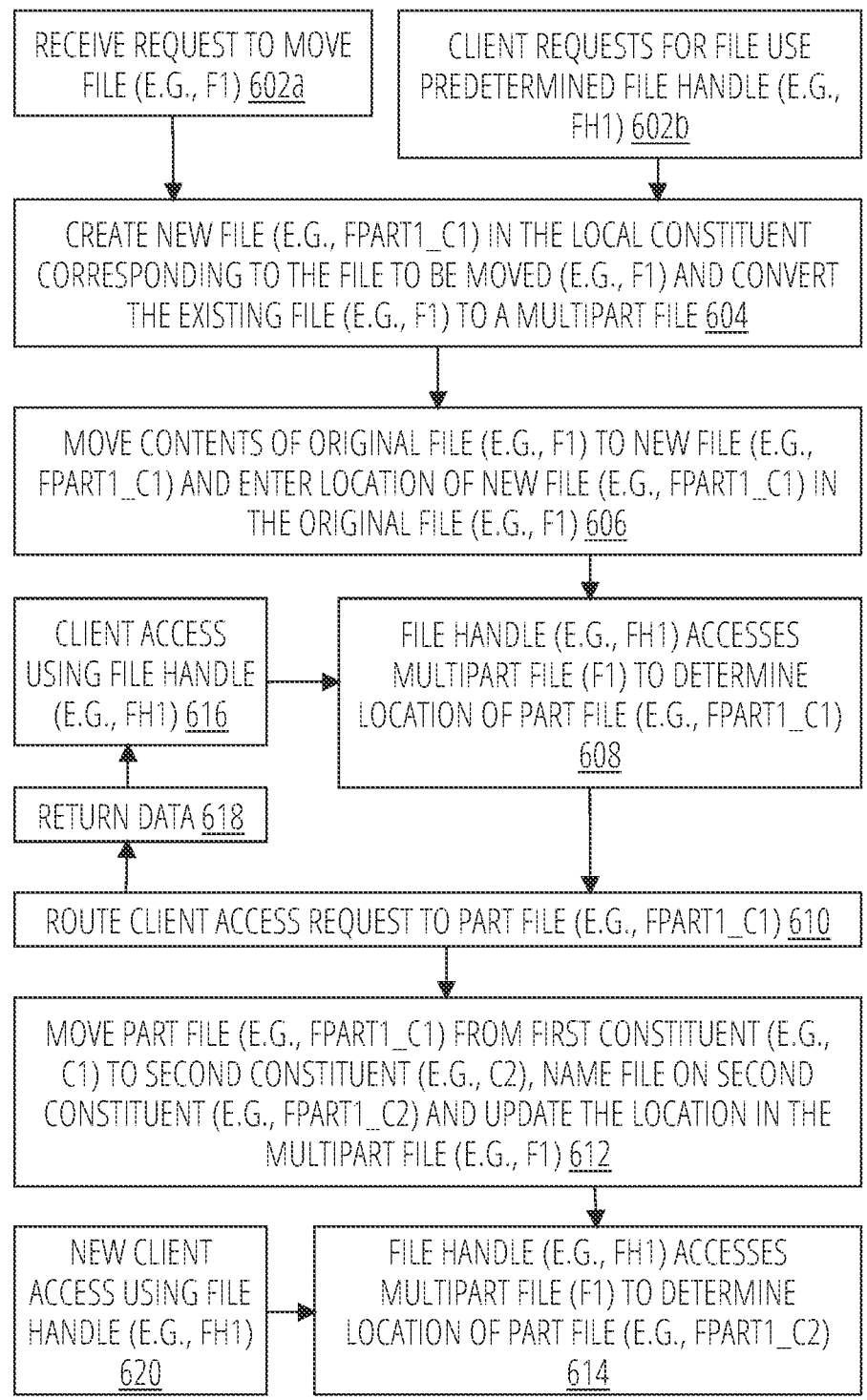
FIG. 6 is a flow diagram of an example file redistribution operation.

FIG. 6 is a flow diagram of an example file redistribution operation. In general, rebalancing of file between multiple constituents is a disruptive process that can interfere with client device access to files during the rebalancing process. However, disruptive rebalancing has drawbacks including interruption of access to files, which interferes with operation of the file system. As described herein, an inode structure called multipart inode forms the building blocks to non-disruptively move a file between constituents. In an example, a multipart inode acts as redirector file so that client still has access to valid file handle thus ensuring no disruptions.

For the following example, assume file (F1) is being moved from a first constituent (C1) to another constituent (C2). In the example, of FIG. 6, a request to move a file is received (e.g., block 602a), for example, by control mechanisms corresponding to the first constituent (C1). Requests and/or triggers to move files can be handled in other ways, for example, a trigger to move a file can be self-generated by the mechanisms for the first constituent (C1) that are responsible for moving (e.g., rebalancing) files.

The file to be moved (F1) has a corresponding file handle (fh1) that client devices use to access the file (e.g., block 602b). During normal operation this file handle (fh1) is used by client devices when generating requests to access the file (F1, which is currently on the first constituent (C1)). In order to provide a non-disruptive file move, clients should be able to utilize the same file handle (fh1) to access the file (F1) during the movement process (otherwise, the move would be a disruptive move because file access would be temporarily interrupted).

When a file movement (e.g., non-disruptive retroactive file movement) occurs, a new file in C1 (FPart1_C1) is created and existing file (F1) is converted to a multipart file (e.g., block 604). In an example, the contents of the original file (F1) are moved to the new file (FPart1_C1) and the location of the new file (FPart1_C1) is an entry in the existing file (F1) that is now a multipart file (e.g., block 606).

When the client uses file handle (fh1) to access the file (e.g., block 616), the access first lands into multipart file F1 where, as a multipart file, the access mechanism obtains a location of part file (FPart_C1) that hosts the data (e.g., block 610). The mechanism determines that part inode FPart1_C1 is in location C1 and routes the client traffic to FPart1_C1 and returns back required data (e.g., block 618).

In an example, after converting the file to multipart file, constituent rebalancing uses a rebalancing engine (e.g., rebalancing engine 530) to effectively move the file (FPart1_C1) from the first constituent (C1) to a second constituent (C2). Once the file is moved to the second constituent (C2) as file FPart1_C2, the rebalancing engine changes the location of part inode in multipart inode to FPart1_C2 in C2 atomically (e.g., block 612).

New client traffic using the file handle (fh1) (e.g., block 620) gets routed to FPart1_C2 through multipart file F1 (e.g., block 614). Hence, there is no disruption to client access as the file handle is intact throughout the file movement.

Note that above use case of multipart inode was specifically for non-disruptive file movement where one multipart file could have only one part inode. There are other use cases of multipart inodes.

Figure 7:
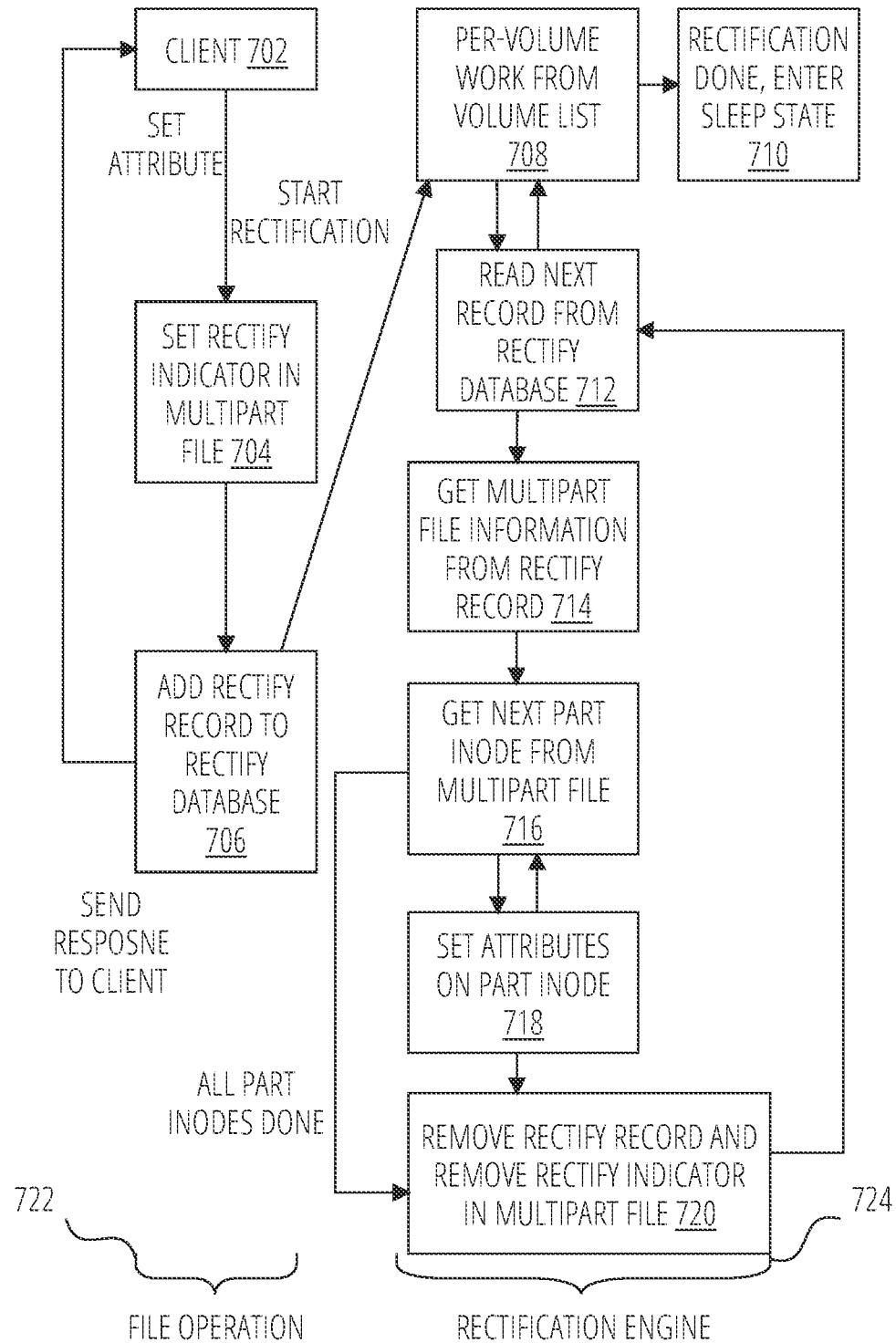
FIG. 7 is a flow diagram for an example approach for background rectification.

FIG. 7 is a flow diagram for an example approach for background rectification. Background rectification applies to changes in a multipart file and then enqueuing a rectify request simultaneously during a file operation context. Thus, the file operation can store relevant information for the rectify request in a metafile (referred to as the rectify database (e.g., rectify db 538 in FIG. 5)) and after storing the relevant information can return a response to a requesting client, entrusting that the attributes will be applied on the part inodes in the background. This method can be used, for example, for attributes that cannot permanently fail to be applied on part inodes but will be completed eventually.

In an example, when a "Set Attribute" request for a multipart file is received, the request is checked to determine if the corresponding attribute(s) is/are to be handled in the background or inline. If the attribute setting is to be handled in the background, the multipart file is marked to indicate that rectification is ongoing and a rectify record is added to the rectify database giving enough information for rectification engine 724 to perform rectification in the background. In an example, rectification engine 724 is notified that work has been added to the rectify database that can be processed by rectification engine 724. After this, the file operation completes successfully and a response it sent to the client 702.

In an example, the core functionality of rectification engine 724 is to apply the required attributes on all part inodes belonging to a selected multipart file. As described in greater detail below, rectification engine 724 walks a volume list on which new rectification work has been added by file operation 722. The rectification work can be background (e.g., FIG. 7 and FIG. 8) or can be in line (e.g., FIG. 9 and FIG. 10).

The flow diagram of FIG. 7 is generally includes two portions, the flow of file operations 722 and the rectification engine 724 flow in response to one or more of file operation 722. To begin the flow illustrated in FIG. 7, client 702 issues one or more "Set Attribute" requests, which can be received and processed by storage operating system 310, for example. Receipt of the Set Attribute request can initiate the rectification process.

In an example, each multipart file has a rectify indicator that rectification engine 724 uses in the rectification process described herein. In response to the Set Attribute requests that starts the rectification process, the rectify indicator is set in the multipart file, 704. A rectify record is added to the rectify database, 706, and then a response is sent to client 702 indicating that the Set Attribute request has completed.

In response to the rectify record being added to the rectify database (706), rectification engine 724 reads the rectify database sequentially for current volume picked from a volume list, 708. Next, rectification engine 724 will process rectification work for each rectify record present in this database, 712. Rectification engine 724 reads the rectify record and gets the multipart file for which the rectification work was triggered, 714. Note that each record could tell rectification engine 724 to set one or more background attributes because the file operation could set more than one attributes.

Rectification engine 724 then walks multipart file and get each of part inodes, 716. For each part inode, rectification engine 724 sends the set attribute operation so that rectification engine 724 sets required attributes on the part inodes, 718. Once all the required attributes are set on all part inodes 718, rectification engine 724 removes the record from rectify database and then clears the state in multipart file that rectification is ongoing, 720.

In an example, the background rectification approach accomplishes similar work on all records in the rectify database until there are no records in database, 712. Rectification engine 724 then picks next volume in volume list, 708, and performs the process of FIG. 7 (e.g., 712, 714, 716, 718, 720). In an example, when the rectification process is complete, rectification engine 724 enters a sleep state, 710.

Figure 8:
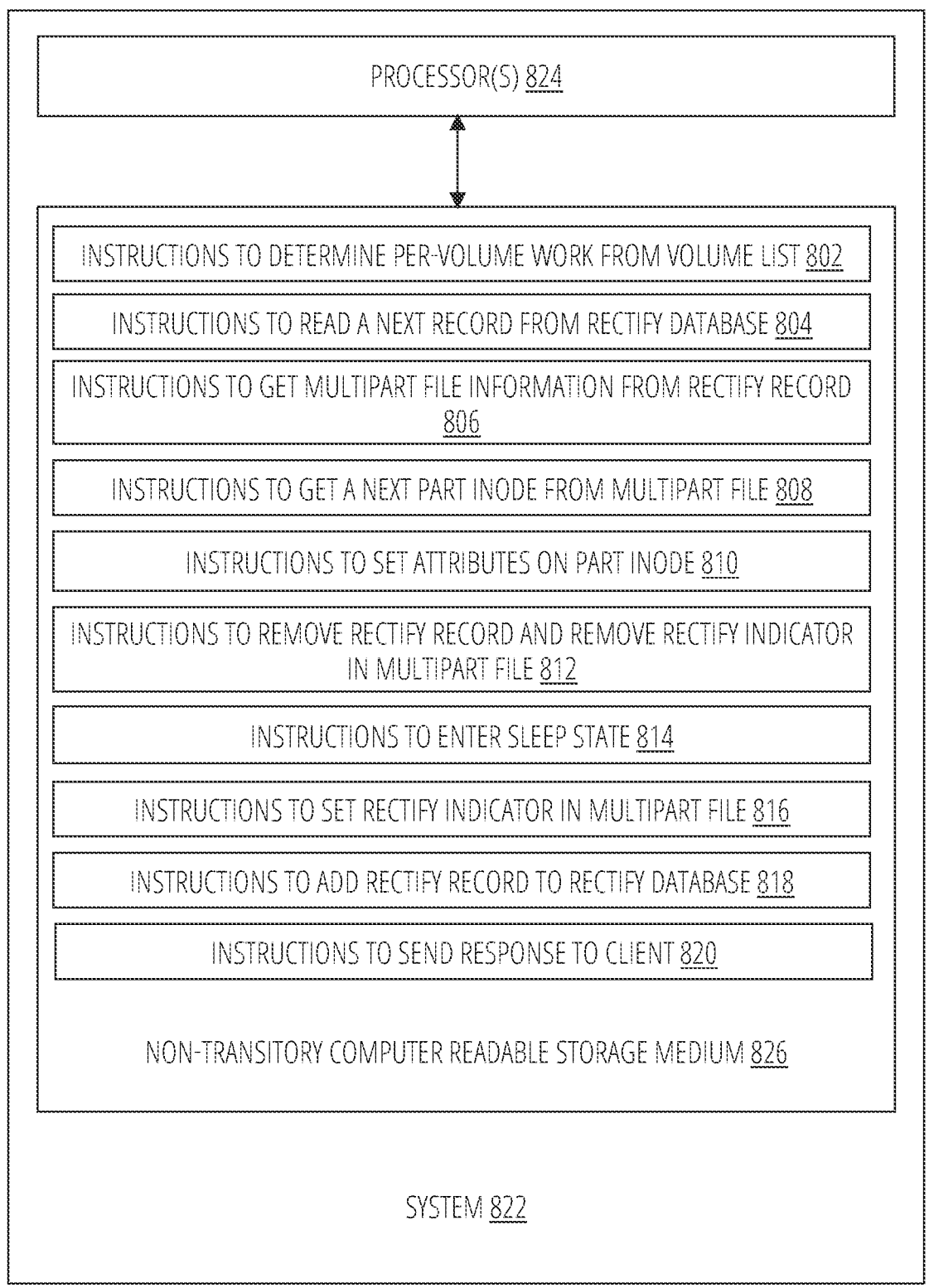
FIG. 8 is an example of a system to provide an approach for background rectification.

FIG. 8 is an example of a system to provide an approach for background rectification. In an example, system 822 can include processor(s) 824 and non-transitory computer readable storage medium 826. In an example, processor(s) 824 and non-transitory computer readable storage medium 826 can be part of a node (e.g., node 300) having a storage operating system (e.g., storage operating system 310) that can provide some or all of the functionality of the ONTAP software as mentioned above.

Non-transitory computer readable storage medium 826 may store instructions 802, 804, 806, 808, 810, 812, 814, 816, 818 and 820 that, when executed by processor(s) 824, cause processor(s) 824 to perform various functions. Examples of processor(s) 824 may include a microcontroller, a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of non-transitory computer readable storage medium 826 include tangible media such as random-access memory (RAM), read-only memory (ROM), electrically erasable programmable read-only memory (EEPROM), flash memory, a hard disk drive, etc.

The example of FIG. 8 generally includes two sets of instructions. The first set of instructions (e.g., 802, 804, 806, 808, 810, 812, 814) correspond to rectification engine 724 as illustrated in FIG. 7. The second set of instructions (e.g., 816, 818, 820) correspond to file operation 722 in FIG. 7.

In an example, each multipart file has a rectify indicator that is used in the rectification process described herein. In response to the Set Attribute (or similar) request that starts the rectification process, instructions 816 cause processor(s) 824 to set the rectify indicator in the multipart file. Instructions 818 cause processor(s) 824 to add a rectify record to the rectify database, and instructions 820 cause processor(s) 824 to send a response to the requesting client device indicating that the Set Attribute request has been completed.

In response to the rectify record being added to the rectify database (instructions 818), instructions 802 cause processor(s) 824 to read the rectify database sequentially for current volume picked from volume list. Next, instructions 804 cause processor(s) 824 to process rectification work for each rectify record present in the database. Instructions 806 cause processor(s) 824 to read the rectify record and get the multipart file for which the rectification work was triggered. Note that each record could tell processor(s) 824 to set one or more background attributes because the file operation could set more than one attributes.

Instructions 808 cause processor(s) 824 to walk (or traverse) the multipart file and get each of part inodes. For each part inode, instructions 810 cause processor(s) 824 to send a set attribute operation and instructions 812 cause processor(s) 824 to set required attributes on the part inodes and to remove the current rectify record from rectify database and then clears the state in multipart file that rectification is ongoing.

In an example, the background rectification approach accomplishes similar work on all records in the rectify database until there are no records in database. When the rectification process is complete, instructions 814 cause processor(s) 824 to cause the rectification engine to enter a sleep state.

Figure 9:
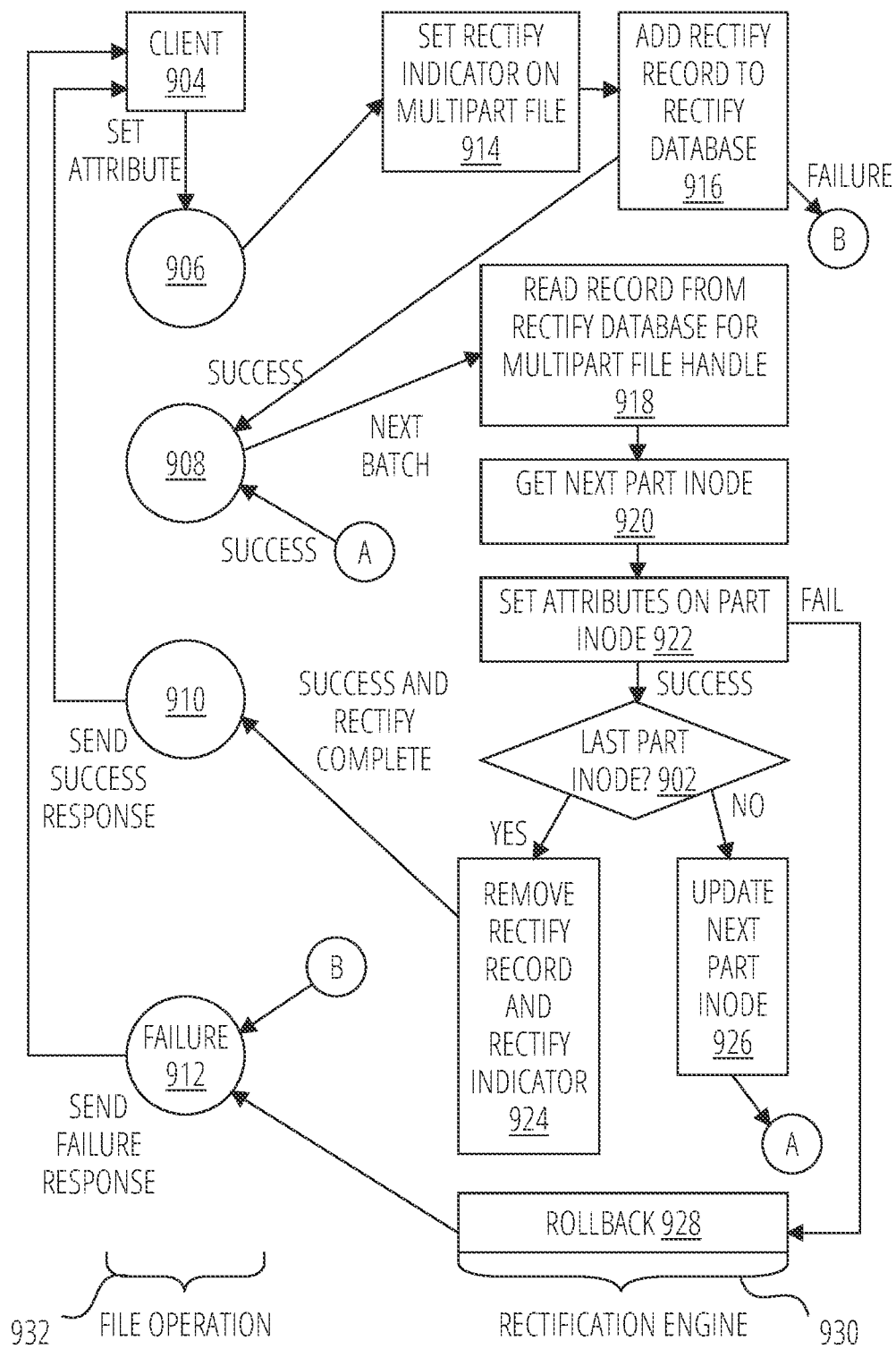
FIG. 9 is a flow diagram for an example approach for inline rectification.

FIG. 9 is a flow diagram for an example approach for inline rectification. Conceptually, inline rectification operates very differently than background rectification. With inline rectification, file attributes are applied on the part inodes before the time the file operation completes. Size, space reservation and allocation size are examples of the attributes that can be handled using inline rectification. One concern with these attributes is that these attributes are not guaranteed to be applied on part inodes and there is no guarantee that these attributes will be applied in background as a background process could fail.

For example, if a file operation attempts to increase the size of file, the file operation functions to increase the size of appropriate part inode and success of the file operation is not guaranteed as the volume that hosts the part inode may not have required space. If the size increase were handled as a background rectification, then the file operation would be considered complete after enqueuing this rectification work.

Because the committed file operation is considered complete, it becomes mandatory for the background rectification work to increase the size of part inode but it can fail if space is not available. Hence, some attributes like size (and others) cannot be rectified background and its rectification is completed before committing the file operation.

Also, the set attribute operation may try to apply attributes to each of part inodes and it is possible that rectification could fail for one of the part inodes after which the set attribute operation is failed. When the set attributes operation fails, the rectification updates must be rolled back. In an example, this rollback is done similar to background rectification by the background engine after the file operation failed with error. Note that all the rollbacks can be done in the background as they do not fail. For instance, if the size of part P1 is increased but the increase in size of part P2 fails, the operation fails and the background rectification engine is allowed to decrease the size of P1 back to previous size as part of rollback. Here rollback will always pass as its about decreasing size which cannot fail.

For the example inline rectification as illustrated in FIG. 9, a Set Attribute request is received from client 904 to cause file operation 932 flow to move to state 906. In an example, the Set Attribute request specifies the multipart file handle for which rectification is to be performed, which is used to set the rectify indicator for the multipart file, 914. Rectification engine 930 asks to insert the rectify record to rectify database, 916. If adding the rectify record to the database, 916, fails, the file operation proceeds to state 912 where a failure response is sent to client 904. If adding the rectify record to the data based, 916, succeeds, the file operation proceeds to state 908 where the next batch is processed.

Rectification engine 930 will search the rectify record corresponding to multipart file handle passed by file operation, 918. Once rectification engine 930 gets the rectify record, 918, rectification engine 930 walks (or traverses) the multipart file and gets each relevant part inode, 920. For each part inode, 920, rectification engine 930 sends a Set Attribute operation so that rectification engine 930 sets required attributes on the part inode(s), 922.

Once all the required attributes are set on all part inodes as determined at decision block 902, rectification engine 930 removes the record from the rectify database (e.g., rectify db 538 in FIG. 5) and then clears the state in multipart file that rectification is ongoing, 924. Success can be communicated via file operation 932 in state 910 back to client 904. Updating of part inodes, 926, continues via state 908.

If rectification engine 930 encounters error, the error is sent back to file operation 932 in state 912 so that the failure response can be sent to client 904. In an example, the rectify record is kept in database as rectification engine 930 may perform rollback 928 for this record. As part of rollback 928, rectification engine 930 reads a catalog file and gets old values for given attributes (i.e., catalog file holds current value of inline attributes) and then updates target value of each of the rollback attributes in the rectify record of database. For instance, if the Set Attribute request is to increase size of a file from 10 M to 20 M, then the rectify record has value of 20 M as target size. Once rectification fails, rectification engine 930 reads the catalog file to determine current size (i.e., 10 M) and update the targets size to 10 M in rectify record. Rectification engine 930 on this record in the same manner as background rectification as described above (i.e., the rectification engine reads this updated record and applies the new attribute values by sending setting attributes to all part inodes of multipart file and then removes rectify record from database and clear state from catalog file).

Figure 10:
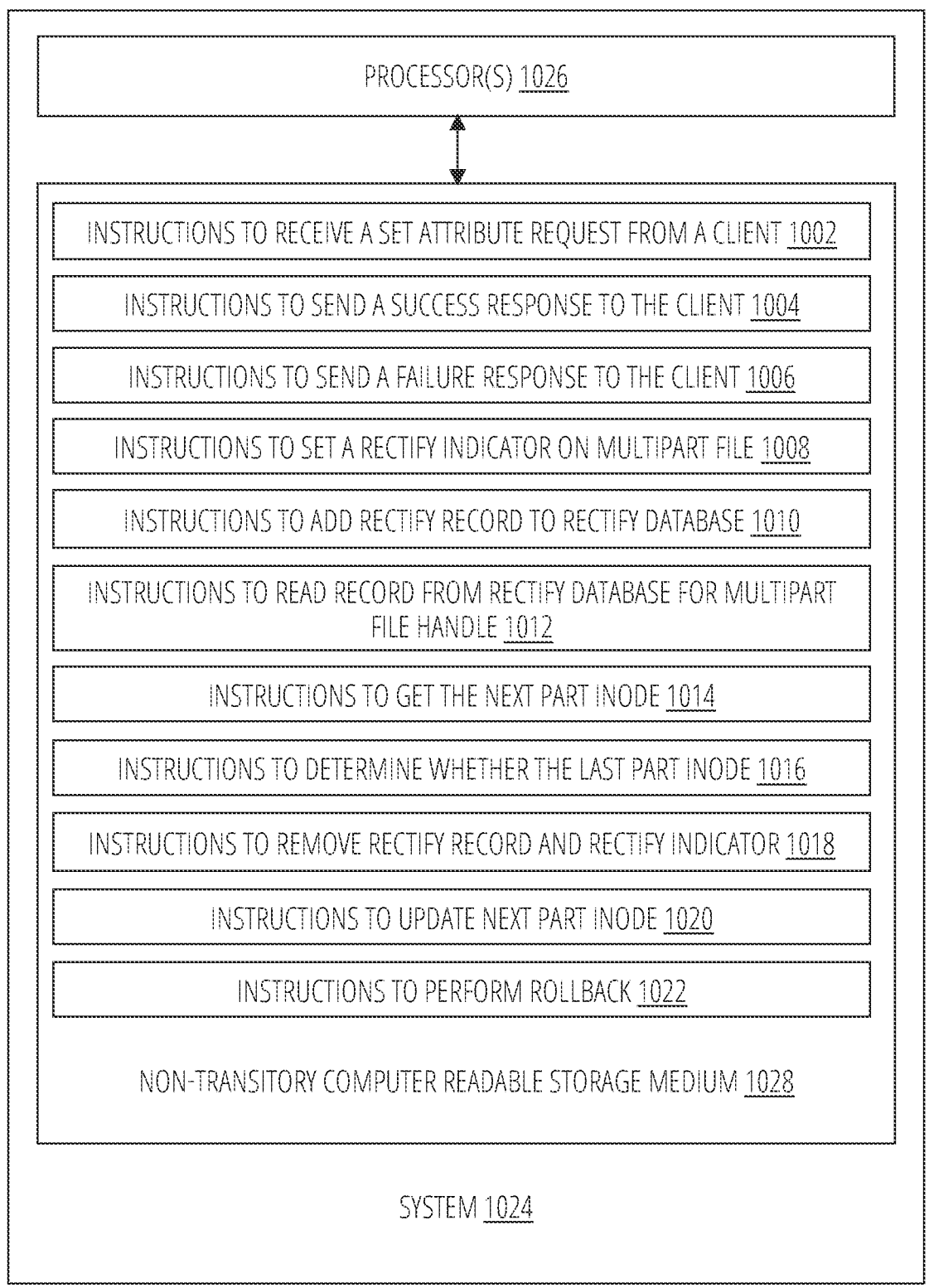
FIG. 10 is an example of a system to provide an approach for inline rectification.

FIG. 10 is an example of a system to provide an approach for inline rectification. In an example, system 1024 can include processor(s) 1026 and non-transitory computer readable storage medium 1028. In an example, processor(s) 1026 and non-transitory computer readable storage medium 1028 can be part of a node (e.g., node 300) having a storage operating system (e.g., storage operating system 310) that can provide some or all of the functionality of the ONTAP software as mentioned above.

Non-transitory computer readable storage medium 1028 may store instructions 1002, 1004, 1006, 1008, 1010, 1012, 1014, 1016, 1018, 1020 and 1022 that, when executed by processor(s) 1026, cause processor(s) 1026 to perform various functions. Examples of processor(s) 1026 may include a microcontroller, a microcontroller, a microprocessor, a CPU, a GPU, a DPU, an ASIC, an FPGA, a SoC, etc. Examples of non-transitory computer readable storage medium 1028 include tangible media such as RAM, ROM, EEPROM, flash memory, a hard disk drive, etc.

The example of FIG. 10 generally includes two sets of instructions. The first set of instructions (e.g., 1002, 1004, 1006) correspond to file operation 932 as illustrated in FIG. 9. The second set of instructions (e.g., 1010, 1012, 1014, 1016, 1018, 1020, 1022) correspond to rectification engine 930 in FIG. 9.

For the example inline rectification as illustrated in FIG. 10, instructions 1002 cause processor(s) 1026 to receive a Set Attribute request a client device. In an example, the Set Attribute request specifies the multipart file handle for which rectification is to be performed, which is used to by instructions 1008 to cause processor(s) 1026 to set the rectify indicator for the multipart file. Instructions 1010 cause processor(s) 1026 to insert the rectify record to rectify database. If adding the rectify record to the database fails, instructions 1006 cause processor(s) 1026 to send a failure response to the client. If adding the rectify record to the rectify database succeeds, the next batch is processed.

Instructions 1012 cause processor(s) 1026 to search the rectify record corresponding to multipart file handle passed by file operation. Once the rectify record is obtained instructions 1014 and 1016 cause processor(s) 1026 to walk (or traverse) the multipart file and get each relevant part inode. For each part inode, instructions 1020 cause processor(s) 1026 to send a Set Attribute operation so that the required attributes are set on the part inode(s).

Once all the required attributes are set on all part inodes as determined as determined by processor(s) 1026 executing instructions 1016, instructions 1018 cause processor(s) 1026 to remove the record from rectify database and clear the state in multipart file. Instructions 1004 cause processor(s) 1026 to communicate success back to the client device.

If an error occurs, instructions 1006 cause processor(s) 1026 to send an indication of the error is sent back to the client device. In an example, the rectify record is kept in database that may be utilized by processor(s) 1026 as part of execution of instructions 1022. As part of the rollback process processor(s) 1026 reads a catalog file and gets old values for given attributes (i.e., catalog file holds current value of inline attributes) and then updates target value of each of the rollback attributes in the rectify record of database. In an example, if the Set Attribute request is to increase size of file from 10 M to 20 M, then the rectify record has value of 20 M as target size. Once rectification fails, processor(s) 1026 reads the catalog file to determine current size (i.e 10 M) and update the targets size to 10 M in rectify record. Rollback to the original 10 M configuration can be performed.

FIG. 11 is a schematic block diagram of a storage operating system that may be advantageously used with the subject matter. Storage operating system 1100 includes a series of software layers organized to form an integrated network protocol stack or, more generally, multi-protocol engine 1104 that provides data paths for clients to access information stored on a node using block and file access protocols. In an example, multi-protocol engine 1104 includes a media access layer (e.g., media access 1142, media access 1144) of network drivers (e.g., gigabit Ethernet drivers) that interfaces to network protocol layers, such as the Internet Protocol (IP) layer (e.g., IP 1138, IP 1140) and the corresponding supporting transport mechanisms, the Transport Control Protocol (TCP) layer (e.g., TCP 1130, TCP 1134) and the User Datagram Protocol (UDP) layer (e.g., UDP 1132).

An example file system (FS) protocol layer (e.g., FS 1136) provides multi-protocol file access and, to that end, includes support for Direct Access File System (DAFS) protocol (e.g., DAFS 1116), Network File System (NFS) protocol (e.g., NFS 1120), Common Internet File System (CIFS) protocol (e.g., CIFS 1122) and the Hypertext Transfer Protocol (HTTP) (e.g., HTTP 1124). Virtual Interface (VI) layer (e.g., VI 1118) implements an architecture to provide direct access transport (DAT) capabilities, such as Remote Direct Memory Access (RDMA), to support Direct Access File System (DAFS) protocol (e.g., DAFS 1116).

An Internet Small Computer Systems Interface (ISCSI) driver layer (e.g., iSCSI 1128) provides block protocol access over TCP/IP network protocol layers, while a Cluster Fabric (CF) driver layer (e.g., CF interface 1110) receives and transmits block access requests and responses to and from the node. In an example, the CF and iSCSI drivers provide CF-specific and iSCSI-specific access control to the blocks and, thus, manage exports of LUNs to either iSCSI or FCP or, alternatively, to both iSCSI and FCP when accessing the blocks on the node.

In addition, storage operating system 1100 includes a series of software layers organized to form storage server 1108 that provides data paths for accessing information stored on disks of a node. To that end, storage server 1108 includes file system module 1148 in cooperating relation with remote access module 1150, RAID system 1152 and disk driver system 1154. RAID system 1152 manages the storage and retrieval of information to and from the volumes/disks in accordance with I/O operations, while disk driver system 1154 implements a disk access protocol such as, e.g., the SCSI protocol.

File system module 1148 implements a virtualization system of storage operating system 1100 through the interaction with one or more virtualization modules illustratively embodied as, e.g., a virtual disk (vdisk) module (not shown) and SCSI target module 1126. SCSI target module 1126 is generally disposed between the FC and iSCSI 1128, file system 1136 and file system 1148 to provide a translation layer of the virtualization system between the block (LUN) space and the file system space, where LUNs are represented as blocks.

File system module 1148 is illustratively a message-based system that provides logical volume management capabilities for use in access to the information stored on the storage devices, such as disks. That is, in addition to providing file system semantics, file system module 1148 provides functions normally associated with a volume manager. These functions include (i) aggregation of the disks, (ii) aggregation of storage bandwidth of the disks, and (iii) reliability guarantees, such as mirroring and/or parity (RAID).

File system module 1148 illustratively implements an exemplary a file system having an on-disk format representation that is block-based using, e.g., 4 kilobyte (kB) blocks and using index nodes ("inodes") to identify files and file attributes (such as creation time, access permissions, size and block location). File system module 1148 uses files to store meta-data describing the layout of its file system; these meta-data files include, among others, an inode file. A file handle, i.e., an identifier that includes an inode number, is used to retrieve an inode from disk. As described in greater detail below, a rebalancing scanner can operation in storage operating system 1100 that supports inodes to scan and evaluate files in order to find one or more candidate files to move to a remote container.

Broadly stated, all inodes of the write-anywhere file system are organized into the inode file. A file system (FS) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from a client is forwarded as a packet over a computer network and onto a node where it is received via a network adapter. A network driver processes the packet and, if appropriate, passes it on to a network protocol and file access layer for additional processing prior to forwarding to the write-anywhere file system. Here, the file system generates operations to load (retrieve) the requested data from disk if it is not resident "in core", i.e., in memory. If the information is not in memory, the file system indexes into the inode file using the inode number to access an appropriate entry and retrieve a logical vbn. The file system then passes a message structure including the logical vbn to, for example, RAID system 1152; the logical vbn is mapped to a disk identifier and disk block number (disk,dbn) and sent to an appropriate driver (e.g., SCSI) of the disk driver system. The disk driver accesses the dbn from the specified disk and loads the requested data block(s) in memory for processing by the node. Upon completion of the request, the node (and operating system) returns a reply to the client over the network.

Remote access module 1150 is operatively interfaced between file system module 1148 and RAID system 1152. Remote access module 1150 is illustratively configured as part of the file system to implement the functionality to determine whether a newly created data container, such as a subdirectory, should be stored locally or remotely. Alternatively, remote access module 1150 may be separate from the file system. As such, the description of remote access module 1150 being part of the file system should be taken as exemplary only. Further, remote access module 1150 determines which remote flexible volume should store a new subdirectory if a determination is made that the subdirectory is to be stored remotely. More generally, remote access module 1150 implements the heuristics algorithms used for the adaptive data placement. However, it should be noted that the use of a remote access module should be taken as illustrative. In alternative aspects, the functionality may be integrated into the file system or other module of the storage operating system. As such, the description of remote access module 1150 performing certain functions should be taken as exemplary only.

It should be noted that while the subject matter is described in terms of locating new subdirectories, the principles of the disclosure may be applied at other levels of granularity, e.g., files, blocks, etc. As such, the description contained herein relating to subdirectories should be taken as exemplary only.

It should be noted that the software "path" through the storage operating system layers described above needed to perform data storage access for the client request received at the node may alternatively be implemented in hardware. That is, a storage access request data path may be implemented as logic circuitry embodied within a field programmable gate array (FPGA) or an application specific integrated circuit (ASIC). This type of hardware implementation increases the performance of the storage service provided by the node in response to a request issued by client 180. Alternatively, the processing elements of adapters (e.g., network adapter 316, storage adapter 324, cluster access adapter 320) may be configured to offload some or all of the packet processing and storage access operations, respectively, from the processor (e.g., processor 304, processor 306), to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node, implement data access semantics of a general-purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that aspects of the disclosure described herein may apply to any type of special-purpose (e.g., file server, filer or storage serving appliance) or general-purpose computer, including a standalone computer or portion thereof, embodied as or including a storage system. Moreover, the teachings contained herein can be adapted to a variety of storage system architectures including, but not limited to, a network-attached storage environment, a storage area network and disk assembly directly attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the subject matter may be utilized with any suitable file system, including a write in place file system.

Illustratively, storage server 1108 is embodied as disk blade 1106 of storage operating system 1100 to service one or more volumes of a disk array (e.g., disk array 246). In addition, multi-protocol engine 1104 is embodied as network blade 1102 to: (i) perform protocol termination with respect to a client issuing incoming data access request packets over a network, as well as (ii) redirect those data access requests to any storage server of the cluster. Moreover, network blade 1102 and disk blade 1106 cooperate to provide a highly scalable, distributed storage system architecture for a cluster (e.g., cluster 200). To that end, each module includes a cluster fabric (CF) interface module (e.g., CF interface 1110, CF interface 1146) adapted to implement intra-cluster communication among the modules (e.g., utilizing CF protocol 1112), including disk element to disk element communication for data container striping operations, for example.

The protocol layers, e.g., the NFS/CIFS layers and the iSCSI/IFC layers, of network blade 1102 function as protocol servers that translate file-based and block-based data access requests from clients into CF protocol messages used for communication with disk blade 1106. That is, the network element servers convert the incoming data access requests into file system primitive operations (commands) that are embedded within CF messages by CF interface 1110 for transmission to disk blade 1106. Notably, CF interface 1110 and CF interface 1146 cooperate to provide a single file system image across all disk blades in a cluster. Thus, any network port of a network element that receives a client request can access any data container within the single file system image located on any disk element of the cluster.

Further, in an illustrative aspect of the disclosure, network blade 1102 and disk blade 1106 are implemented as separately scheduled processes of storage operating system 1100; however, in an alternate aspect, the network blade 1102 and disk blade 1106 may be implemented as pieces of code within a single operating system process. Communication between a network element and disk element is thus illustratively affected through the use of message passing between the modules although, in the case of remote communication between a network element and disk element of different nodes, such message passing occurs over cluster switching fabric 216. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp™, Inc.

CF interface 1110 and CF interface 1146 implement a CF protocol for communicating file system commands among the modules of the cluster. Communication is illustratively affected by the disk element exposing the CF API to which a network element (or another disk element) issues calls. To that end, the CF interface modules are organized as a CF encoder and CF decoder. The CF encoder encapsulates a CF message as (i) a local procedure call (LPC) when communicates a file system command to a disk element residing on the same node or (ii) a remote procedure call (RPC) when communicating the command to a disk element residing on a remote node of the cluster. In either case, the CF decoder de-encapsulates the CF message and processes the file system command.

Illustratively, the remote access module may utilize CF messages to communicate with remote nodes to collect information relating to remote flexible volumes. A CF message is used for RPC communication over the switching fabric between remote modules of the cluster; however, it should be understood that the term "CF message" may be used generally to refer to LPC and RPC communication between modules of the cluster. The CF message includes a media access layer, an IP layer, a UDP layer, a reliable connection (RC) layer and a CF protocol layer. The CF protocol is a generic file system protocol that conveys file system commands related to operations contained within client requests to access data containers stored on the cluster; the CF protocol layer is that portion of a message that carries the file system commands. Illustratively, the CF protocol is datagram based and, as such, involves transmission of messages or "envelopes" in a reliable manner from a source (e.g., network blade 1102) to a destination (e.g., disk blade 1106). The RC layer implements a reliable transport protocol that is adapted to process such envelopes in accordance with a connectionless protocol, such as UDP.

In one embodiment, a data container is represented in the write-anywhere file system as an inode data structure adapted for storage on the disks 230. In such an embodiment, an inode includes a meta-data section and a data section. The information stored in the meta-data section of each inode describes the data container (e.g., a file) and, as such, includes the type (e.g., regular, directory, vdisk) of file, its size, time stamps (e.g., access and/or modification time) and ownership (e.g., user identifier (UID) and group ID (GID), of the file, and a generation number. The contents of the data section of each inode may be interpreted differently depending upon the type of file (inode) defined within the type field. For example, the data section of a directory inode includes meta-data controlled by the file system, whereas the data section of a regular inode includes file system data. In this latter case, the data section includes a representation of the data associated with the file.

Specifically, the data section of a regular on-disk inode may include file system data or pointers, the latter referencing 4 KB data blocks on disk used to store the file system data. Each pointer is preferably a logical vbn to facilitate efficiency among the file system and the RAID system when accessing the data on disks. Given the restricted size (e.g., 228 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section of the inode (e.g., a second level inode) references an indirect block (e.g., a first level L1 block) that contains 1024 pointers, each of which references a 4 KB data block on disk. For file system data having a size greater than 64 MB, each pointer in the data section of the inode (e.g., a third level L3 inode) references a double-indirect block (e.g., a second level L2 block) that contains 1024 pointers, each referencing an indirect (e.g., a first level L1) block. The indirect block, in turn, which contains 1024 pointers, each of which references a 4 KB data block on disk. When accessing a file, each block of the file may be loaded from disk into the memory.

When an on-disk inode (or block) is loaded from disk into memory, its corresponding in-core structure embeds the on-disk structure. For example, the dotted line surrounding the inode indicates the in-core representation of the on-disk inode structure. The in-core structure is a block of memory that stores the on-disk structure plus additional information needed to manage data in the memory (but not on disk). The additional information may include, e.g., a "dirty" bit. After data in the inode (or block) is updated/modified as instructed by, e.g., a write operation, the modified data is marked "dirty" using the dirty bit so that the inode (block) can be subsequently "flushed" (stored) to disk.

According to one embodiment, a file in a file system comprises a buffer tree ("buftree") that provides an internal representation of blocks for a file loaded into memory and maintained by the write-anywhere file system. A root (top-level) inode, such as an embedded inode, references indirect (e.g., level 1) blocks. In other embodiments, there may be additional levels of indirect blocks (e.g., level 2, level 3) depending upon the size of the file. The indirect blocks (e.g., and inode) includes pointers that ultimately reference data blocks used to store the actual data of the file. That is, the data of file are contained in data blocks and the locations of these blocks are stored in the indirect blocks of the file. Each level 1 indirect block may include pointers to as many as 1024 data blocks. According to the "write anywhere" nature of the file system, these blocks may be located anywhere on the disks.

FIG. 12 illustrates one embodiment of a block diagram of an on-disk layout of an aggregate. Some of the elements illustrated in FIG. 12 can be utilized by a rebalancing scanner to evaluate files for potential movement to a remote container including, for example, filesystem file 1222, hidden metadata root directory 1242, etc.

The storage operating system (e.g., storage operating system 310) utilizes the RAID system (e.g., RAID system 1152), to assemble a physical volume of pvbns to create an aggregate (e.g., aggregate 502), with pvbns 1 and 2 comprising a "physical" volinfo block 1202 for the aggregate. In an example, volinfo block 1202 contains block pointers to fsinfo block(s) 1204, each of which may represent a snapshot of the aggregate. Each fsinfo block(s) 1204 includes a block pointer to an inode file 1206 that contains inodes of a plurality of files, including owner map 1208, active map 1210, summary map 1212 and space map 1214, as well as other special meta-data files. Inode file 1206 further includes root directory 1216 and hidden metadata root directory 1218, the latter of which includes a namespace having files related to a flexible volume in which users cannot "see" the files. In an example, hidden metadata root directory 1218 includes the WAFL/fsid/directory structure (WAFL/fsid 1220) that contains filesystem file 1222 and storage label file 1224. In an example, root directory 1216 in the aggregate is empty; files related to the aggregate are organized within hidden metadata root directory 1218.

In addition to being embodied as a container file having level 1 blocks organized as a container map, filesystem file 1222 includes block pointers that reference various file systems embodied as one or more flexible volume 1226. The aggregate maintains these flexible volumes at special reserved inode numbers. In an example, each flexible volume 1226 also has reserved inode numbers within its flexible volume space that are used for, among other things, the block allocation bitmap structures. As noted, the block allocation bitmap structures, e.g., active map 1234, summary map 1236 and space map 1238, are located in each flexible volume.

Specifically, each flexible volume 1226 has the same inode file structure/content as the aggregate, with the exception that there is no owner map and no WAFL/fsid/file system file, storage label file directory structure in hidden metadata root directory 1242. To that end, each flexible volume 1226 has volinfo block 1228 that points to one or more fsinfo block(s) 1230, each of which may represent a snapshot, along with the active file system of the flexible volume. Each fsinfo block, in turn, points to an inode file 1232 that, as noted, has the same inode structure/content as the aggregate with the exceptions noted above. Each flexible volume 1226 has its own inode file 1232 and distinct inode space with corresponding inode numbers, as well as its own root directory 1240 and subdirectories of files that can be exported separately from other flexible volumes.

Storage label file 1224 contained within hidden metadata root directory 1218 of the aggregate is a small file that functions as an analog to a conventional RAID label. A RAID label includes physical information about the storage system, such as the volume name; that information is loaded into storage label file 1224. Illustratively, storage label file 1224 includes the flexible volume name 1244 of the associated flexible volume 1226, online/offline status 1246 of the flexible volume, and identity and state 1248 of the associated flexible volume (whether it is in the process of being created or destroyed).

Embodiments may be implemented as any or a combination of one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

The terms "component", "module", "system," and the like as used herein are intended to refer to a computer-related entity, either software-executing general-purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk. EEPROM (electrically erasable programmable read only memory), memory stick or any other storage device type, in accordance with the claimed subject matter.

What is claimed is:

1. A non-transitory computer readable medium having stored thereon instructions to perform background rectification for setting file attributes, the instructions, when executed, cause one or more processors to:
receive a request to set one or more attributes for one or more parts of a multipart file, wherein the multipart file was created from an original file and utilizes a redirection layer that includes a directory that indicates a plurality of nodes corresponding to the original file;
set, in response to the request, a rectify indicator in the multipart file, the rectify indicator to indicate one or more attributes for the multipart file are to be set;
generate, in response to the request, an entry corresponding to the request in a rectify database;
send a completion message in a response message in response to the request before all of the one or more attributes for the multipart file have been set;
set the one or more attributes for the one or more parts of the multipart files using at least the entry in the rectify database; and
remove the entry in the rectify database from the rectify database.

2. The non-transitory computer readable medium of claim 1 wherein the multipart file comprises links to one or more part inode files that each comprise a portion of user data previously stored in the multipart file.

3. The non-transitory computer readable medium of claim 1 wherein the distributed storage system utilizes a write anywhere file system.

4. The non-transitory computer readable medium of claim 1 wherein the multipart file is generated from an original file as part of a non-disruptive file movement process.

5. The non-transitory computer readable medium of claim 1 further comprising instructions that, when executed, cause the one or more processors to, in response to a failure in setting the attribute for at least one of the parts of the multipart file, rolling back the setting of the attribute for all other parts of the multipart file.

6. A node in a distributed storage system comprising:
a memory system to store the multipart files;
at least one hardware processor coupled with the memory system, the at least one hardware processor to:
receive a request to set one or more attributes for one or more parts of a multipart file, wherein the multipart file was created from an original file and utilizes a redirection layer that includes a directory that indicates a plurality of nodes corresponding to the original file,
set, in response to the request, a rectify indicator in the multipart file, the rectify indicator to indicate one or more attributes for the multipart file are to be set,
generate, in response to the request, an entry corresponding to the request in a rectify database,
send a completion message in response message in response to the request before all of the one or more attributes for the multipart file have been set,
set the one or more attributes for the one or more parts of the multipart files using at least the entry in the rectify database, and
remove the entry in the rectify database from the rectify database.

7. The node of claim 6 wherein the multipart file comprises links to one or more part inode files that each comprise a portion of user data previously stored in the multipart file.

8. The node of claim 6 wherein the distributed storage system utilizes a write anywhere file system.

9. The node of claim 6 wherein the multipart file is generated from an original file as part of a non-disruptive file movement process.

10. The node of claim 6 wherein the at least one hardware processor is further configured to, in response to a failure in setting the attribute for at least one of the parts of the multipart file, rolling back the setting of the attribute for all other parts of the multipart file.

11. A non-transitory computer readable medium having stored thereon instructions to perform inline rectification for setting file attributes, the instructions, when executed, cause one or more processors to:
receive a request to set one or more attributes for one or more parts of a multipart file, wherein the multipart file was created from an original file and utilizes a redirection layer that includes a directory that indicates a plurality of nodes corresponding to the original file;
set, in response to the request, a rectify indicator in the multipart file, the rectify indicator to indicate one or more attributes for the multipart file are to be set;
generate, in response to the request, an entry corresponding to the request in a rectify database;

set the one or more attributes for the one or more parts of the multipart files using at least the entry in the rectify database;

remove the entry in the rectify database from the rectify database; and send a completion message in response message in response to the request after all of the one or more attributes for the multipart file have been set.

12. The non-transitory computer readable medium of claim 11 wherein the multipart file comprises links to one or more part inode files that each comprise a portion of user data previously stored in the multipart file.

13. The non-transitory computer readable medium of claim 11 wherein the distributed storage system utilizes a write anywhere file system.

14. The non-transitory computer readable medium of claim 11 wherein the multipart file is generated from an original file as part of a non-disruptive file movement process.

15. The non-transitory computer readable medium of claim 11 further comprising instructions that, when executed, cause the one or more processors to, in response to a failure in setting the attribute for at least one of the parts of the multipart file, rolling back the setting of the attribute for all other parts of the multipart file.

16. A node in a distributed storage system comprising:
a memory system to store the multipart files;
at least one hardware processor coupled with the memory system, the at least one hardware processor to:
receive a request to set one or more attributes for one or more parts of a multipart file, wherein the multipart file was created from an original file and utilizes a redirection layer that includes a directory that indicates a plurality of nodes corresponding to the original file, set, in response to the request, a rectify indicator in the multipart file, the rectify indicator to indicate one or more attributes for the multipart file are to be set, generate, in response to the request, an entry corresponding to the request in a rectify database, set the one or more attributes for the one or more parts of the multipart files using at least the entry in the rectify database, remove the entry in the rectify database from the rectify database, and send a completion message in response message in response to the request after all of the one or more attributes for the multipart file have been set.

17. The node of claim 16 wherein the multipart file comprises links to one or more part inode files that each comprise a portion of user data previously stored in the multipart file.

18. The node of claim 16 wherein the distributed storage system utilizes a write anywhere file system.

19. The node of claim 16 wherein the multipart file is generated from an original file as part of a non-disruptive file movement process.

20. The node of claim 16 wherein the at least one hardware processor is further configured to, in response to a failure in setting the attribute for at least one of the parts of the multipart file, rolling back the setting of the attribute for all other parts of the multipart file.

* * * * *